Sept. 15, 1936.                J. LEVY                 2,054,224
           REMOTE CONTROL FOR DIRECTING PROJECTED LIGHT
                  Filed March 1, 1935        3 Sheets-Sheet 1

INVENTOR
Joseph Levy
BY
Louis Barnett
ATTORNEY

Sept. 15, 1936.  J. LEVY  2,054,224
REMOTE CONTROL FOR DIRECTING PROJECTED LIGHT
Filed March 1, 1935  3 Sheets-Sheet 2

INVENTOR
Joseph Levy
BY
Louis Barnett
ATTORNEY

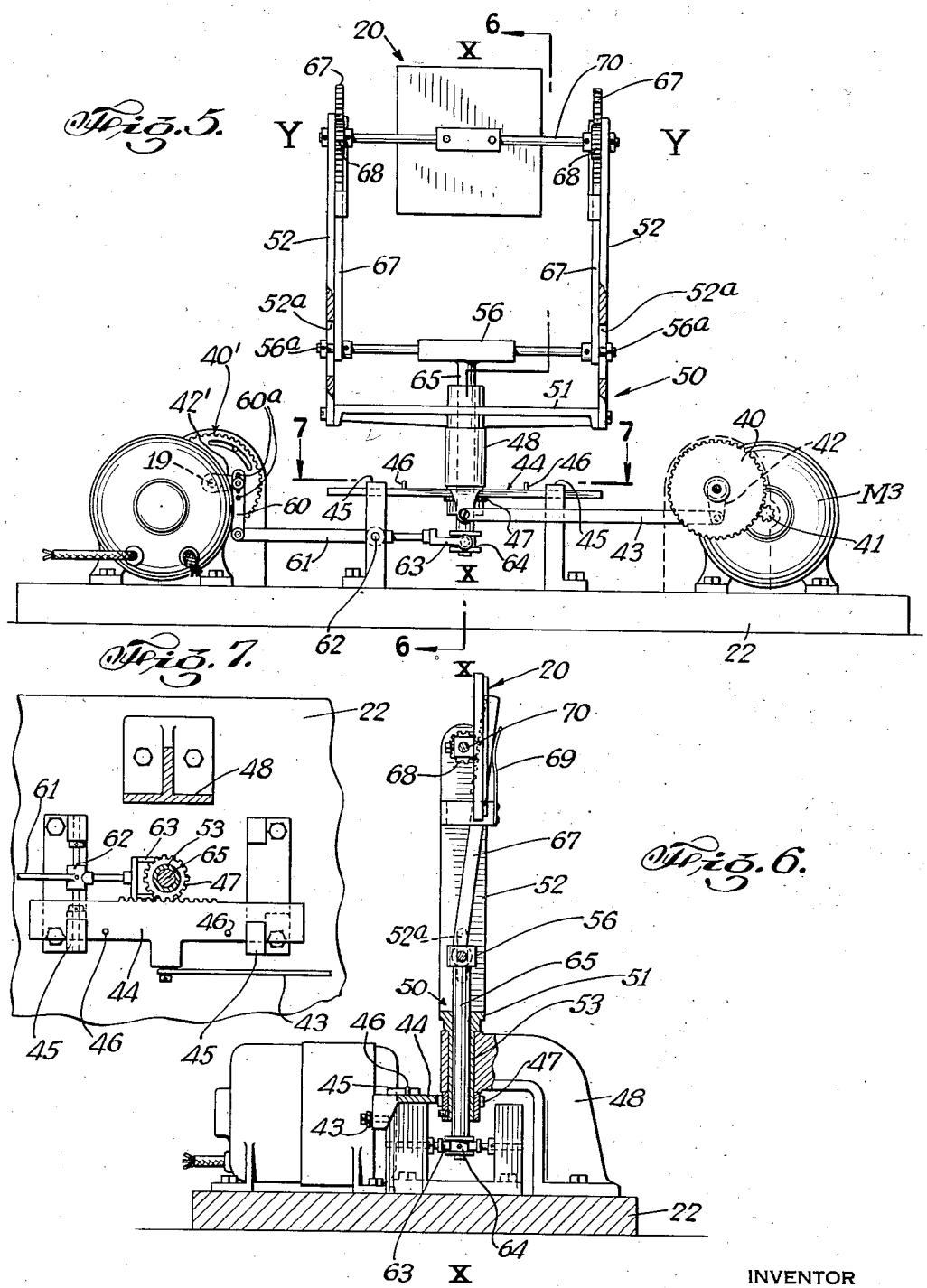

Patented Sept. 15, 1936

2,054,224

UNITED STATES PATENT OFFICE 2,054,224

REMOTE CONTROL FOR DIRECTING PROJECTED LIGHT

Joseph Levy, New York, N. Y., assignor to Century Lighting Equipment, Inc., New York, N. Y., a corporation of New York Application March 1, 1935, Serial No. 8,854

1 Claim. (Cl. 240—61.1)

This invention relates to remote controlled apparatus for adjusting, guiding, controlling or directing the position of light projectors or mirrors, or the like, such as used for indoor or outdoor illumination in stage and display lighting, and for other like purposes, requiring the positioning of a light source, projector or reflector from a distance control point.

Among the objects of the invention is to generally improve remote controlled apparatus of the character described whereby few and simple parts shall be required, which shall be easily manipulated, controlled and adjusted, which shall be relatively cheap to construct, install and maintain, and which shall be practical and efficient to a high degree in use.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claim.

In the accompany drawings, in which are shown various possible illustrative embodiments of this invention.

Figure 2:
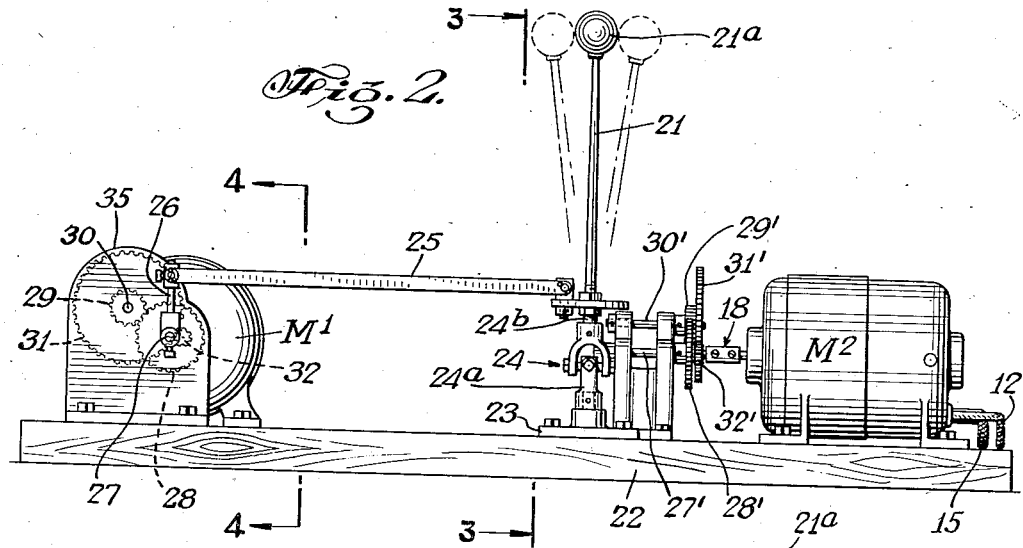
Fig. 2 is a front elevational view of the unit shown in the lower portion of Fig. 1.
Figure 3:
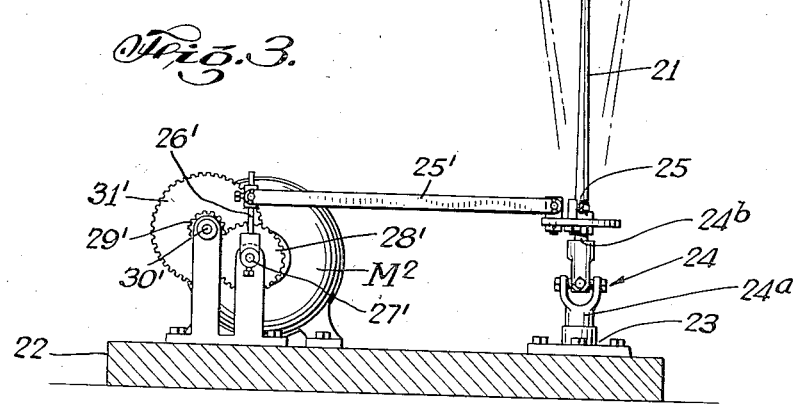
Figure 4:
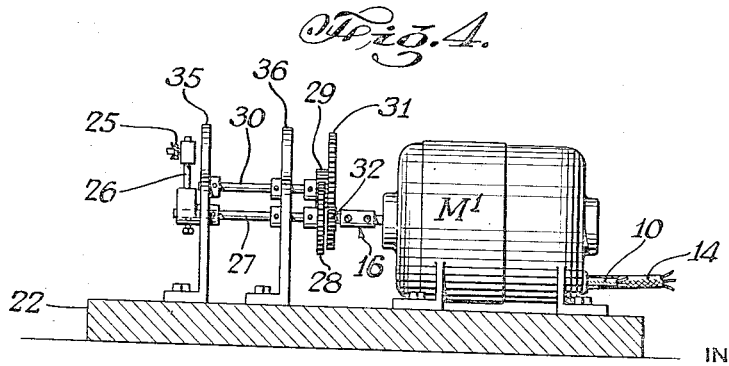

Figs. 3 and 4 are views looking in the direction of the arrowed lines 3—3 and 4—4, respectively, in Fig. 2.

Figure 1:
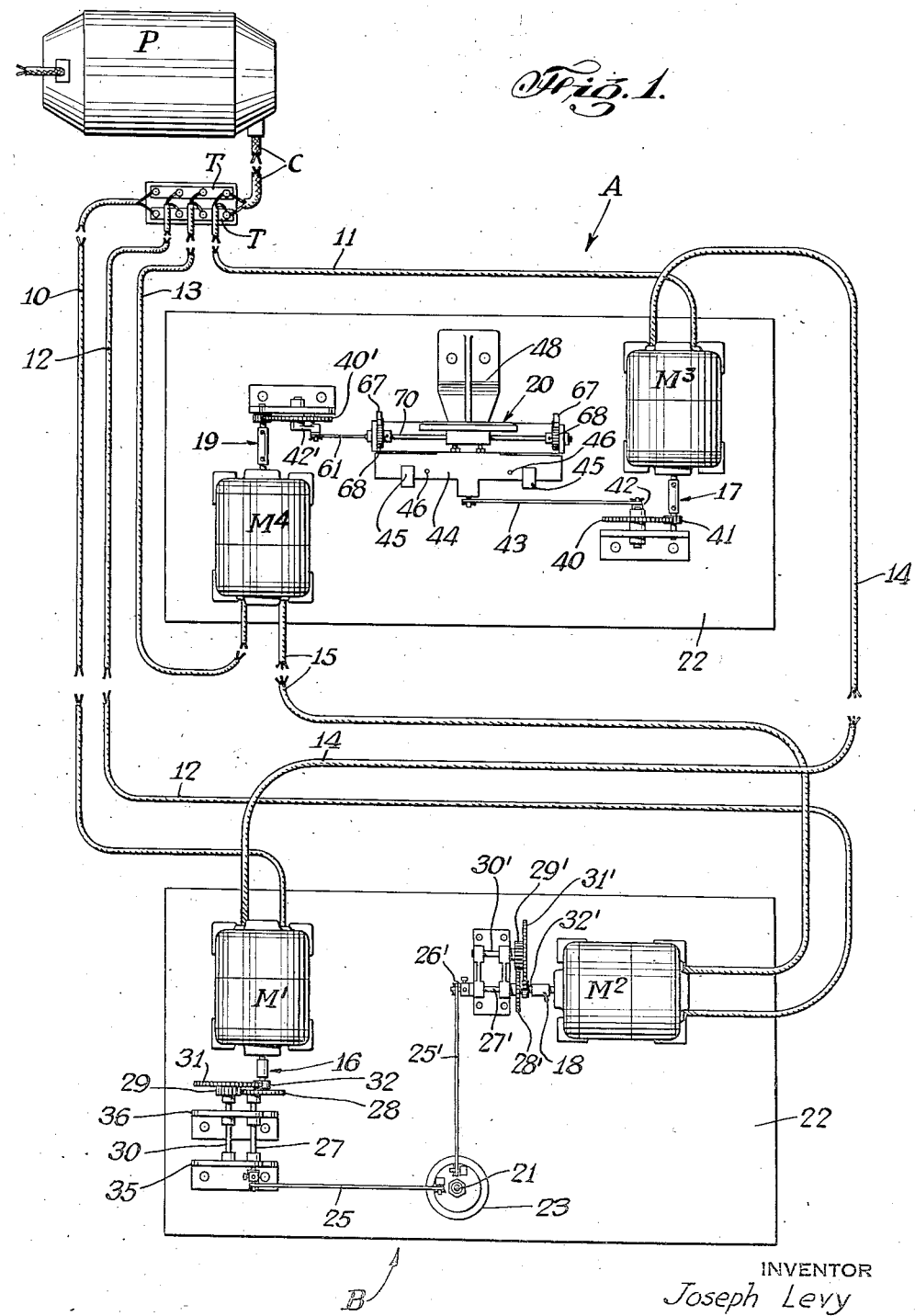
Fig. 1 is a plan view of a remote controlled apparatus embodying the invention applied to selectively position a light reflector or projector whereby illumination may be directed in either horizontal or vertical planes or in angular relation to such planes by means of a single lever.

Fig. 5 is a front elevational view of the unit shown in the upper portion of Fig. 1, and Figs. 6 and 7 are sectional views taken on lines 6—6 and 7—7, respectively, in Fig. 5.

Referring in detail to the drawings, an apparatus embodying the invention is shown which may comprise two spaced units indicated generally at A (the upper portion) and B (the lower portion) in Fig. 1. The apparatus may include a dynamotor or other suitable power source P which through a cable C supplies power to bus terminals T. The latter, through cables 10, 11, 12, and 13 feed power to "Selsyn" type motors M1, M2, M3, and M4 of well understood construction.

As seen from Fig. 1, the circuit connections of these motors M1, M2, M3, and M4 with the cables 10, 11, 12, and 13 are such that the motors M1 and M3 cooperate, being connected in the power circuit through cables 10 and 11 and interconnected with each other through cable 14, and motors M2 and M4 cooperate, being similarly connected in circuit through cables 12 and 13 and interconnected through cable 15. As is well understood, the motion transmission through the pairs of motors M1, M3 and M2, M4 operate in such a manner that on rotating the armature shaft 16 of the motor M1, an exact and identical rotation of the armature shaft 17 of the motor M3 is produced. Similarly, the rotation of the armature shaft 18 of the motor M2, produces an exact and identical rotation of the armature shaft 19 of the motor M4. The parts of the apparatus are so constructed and arranged so as to selectively position a light projector 20 or in this case a mirror reflector, or the like (hereinafter referred to as a light projector), included in unit A in horizontal or vertical planes or in angular relation to such planes by means of manipulating a single control lever 21 included in unit B which may be spaced therefrom, as will hereinafter be described.

The control lever 21 may be mounted on a suitable fixed support 22 of the unit A by any suitable means such as the bolted base 23. A universal joint 24 or the like has a lower end 24a supported on said base 23 and the other or upper end 24b being secured to be operated by the lever 21 having a terminal knob 21a. Thus the lever 21 may be moved to the right and left, as shown in Figs. 1 and 2, or forward and backward, as shown in Figs. 1 and 3, through the joint 24 so as to be selectively positioned in angular relation with respect to vertical or upright positions as indicated in full and dotted lines in Figs. 2 and 3.

When lever 21 is swung to the right or left (Fig. 2), it moves a link 25 to angularly displace a rock arm 26 connected in driving relation to a shaft 27 as shown in Fig. 4. This latter shaft has mounted to turn therewith, a gear 28 meshing with a gear 29 mounted on a shaft 30 lying parallel to shaft 27. Both of these shafts 27 and 30 are suitably journalled in spaced upright members 35 and 36, see Figs. 1 and 4. Gear 29 is rigidly attached to turn with a larger gear 31 meshing with a pinion gear 32 keyed to the shaft 16 of "Selsyn" motor M1.

In the "Selsyn type" of transmission, current supplied to motors M1 and M3, the interconnection of the motors through cable 14 and movement of the motor armature shaft 16 of motor M1 causes the shaft 17 of the motor M3 with the pinion 41 to turn to the same relative degree as the armature shaft 16 of the motor M1. The pinion 41 meshes with gear 40 which is mounted to turn with a rock arm 42 and the latter moves a rack bar 44 to slide in spaced guides 45 through the link 43 as shown in Figs. 5 and 7.

A frame 50 which includes a T-mounting 51 and spaced uprights 52 support the light projector 20 for movement about a vertical axis X—X, said movement being effected through a pinion 47 fixed to turn with a sleeve shaft 53 forming part of the T-mounting 51. Said shaft is journalled in the stationary bracket arm 48 bolted to support 22 and said pinion 47 meshes with said rack bar 44 as is shown in Figs. 5, 6, and 7. The above described gear trains between the lever 21 and the motor shaft 16, and between the motor shaft 17 and the frame 50 serves as motion reduction means to give the proper ratio changes of movement of the lever 21 with respect to each of the motor shafts 16 and 18.

A link 60 having a plurality of spaced holes 60a formed therein, is connected at one end to a rock arm 42' and at the other end to a lever 61 which is fulcrumed at 62 on one of the spaced guides 45, as shown in Figs. 5 and 7. The end of lever 61 opposite the link 60 connecting with the arm 42' carries a fork 63 engaging in a grooved collar 64, the latter being rigidly connected to a lower end of a slidable shaft 65. Said shaft 65 extends through the sleeve shaft 53 and carries at the upper end thereof a cross-bar 56 whose ends 56a are slidably fitted in elongated slots 52a of the lower end of the frame uprights 52.

Inwardly from each cross-shaft 70 which has secured to turn therewith the light projector 20, said shaft 70 being journalled in the frame uprights 52 at the upper end thereof. Each rack bar 67 may be swingably mounted on the cross-bar 56 and flat springs 69 on frame uprights 52 are provided to hold the teeth of said rack bars in mesh with the pinions 68. This construction permits an initial adjustment of the light projector 20 with respect to the control handle 21, such adjustment being accomplished by moving the rack bars 67, against action of the flat springs 69, out of mesh with the pinions 68 and turn the projector 20 to any desired angle with respect to the horizontal plane and then releasing the rack bars 67 to reengage with the pinions 68.

If the lever 21 be moved in forward and backward directions (Fig. 3) instead of from right to left, a link 25' will react upon a rock arm 26' which turns with a shaft 27' for rotating the gear 28' meshing with the gear 29' mounted to turn with the shaft 30'. The gear 29' is mounted to turn with a larger gear 31' meshing with a pinion gear 32' keyed to the shaft 18 of the motor M2. Both of the shafts 27' and 30' are suitably journalled in spaced upright members 35' and 36' (see Figs. 1 and 3). The arrangement of the parts and operations of the above described gear train being the same as has been already referred to in connection with the gear train assembly associated with "Selsyn" motor M1. The movement of the armature shaft 18 of the motor M2 and the connection of the cable 15 with the "Selsyn" motor M4 causes the shaft 19 of the latter with the pinion 41' to turn to the same relative degree as the rotation of the armature 18 for driving the rock arm 42'. The above described gear trains between the lever 21 and the motor shaft 19 and the projector 20 and the shaft 70 supporting said projector serves as a motion reduction means to give the proper changes of movement of the lever 21 and of the motor shafts 17 and 19, respectively.

With the apparatus as described above and shown in the drawings, it will be seen that when the lever 21 moves in the direction from right to left, as shown in Fig. 2, the motion reduction means and the motor transmission M1 and M3 move the link 43 to rotate the frame 50 with projector 20 about the vertical axis X—X. If on the other hand, the lever 21 is moved in a forward and backward direction, as shown in Fig. 3, the motion reduction means and the motor transmissions M2 and M4 move the lever 61 for sliding the shaft 65 together with the bar 56 through the sleeve shaft 53 to raise or lower the rack bars 67 to swing the projector 20 on the shaft 70 about the horizontal axis Y—Y. Obviously, if the lever 21 is moved into intermediate positions, that is, combining both the left and right, and backward and forward movements, then the motion reduction means and the motor transmissions M1, M2 and M3, M4 respectively, will simultaneously effect the resulting movement to the projector 20 about both its horizontal axis X—X and vertical axis Y—Y whereby the light can be projected in any desired direction on manipulation of the lever 21. The various holes of link 60 provide adjustment of the angular displacement of the lever 61 and set the initial position of the projector 20 in a desired vertical plane.

The apparatus above described can be used for stage or other display lighting with the unit A, including the light projector 20, located for example, adjacent the ceiling of a theatre and with the unit B, including the control lever 21, on the stage, the reflected or projected light from the projector 20 may then be caused to illuminate any part of the stage and such light may be made to readily follow the performer or moving object by manipulating the control lever 21.

It will thus be seen that there is provided apparatus in which the several objects of this invention are achieved and which are well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

In a remote control system comprising a directional energy translating device mounted to oscillate about a pair of axes, a pair of electric motors to oscillate said device about one axis and a second pair of electric motors to oscillate said device about the other axis, one of the motors in each pair being mechanically connected to said device, and the other being located at a point remote from said device and the motors in each pair being electrically connected so that movement of the rotor of one results in a corresponding movement of the rotor of the other; a lever for mechanically rotating the rotors of the remote motors independently and concomitantly, said lever having at one end a mounting permitting universal movement thereof and being free at the other end for manipulation and mechanical means including links extending at right angles to each other interposed between an intermediate point on said lever and each rotor of said remote motors to resolve movements of said lever into corresponding components for converting a translational movement of said lever into a rotational movement of said rotors.

JOSEPH LEVY.